UNITED STATES PATENT OFFICE.

ALFRED W. FRENCH, OF PIQUA, OHIO.

METHOD OF TREATING COTTON-SEED.

1,121,913.  Specification of Letters Patent.  Patented Dec. 22, 1914.

No Drawing. Application filed July 6, 1914. Serial No. 849,338.

*To all whom it may concern:*

Be it known that I, ALFRED W. FRENCH, a citizen of the United States, residing at Piqua, in the county of Miami and State of Ohio, have invented a new and useful Improvement in Methods of Treating Cotton-Seed, of which the following is a specification.

In the treatment of cotton seed preparatory to expressing the oil therefrom it has been quite commonly the practice to run the cotton seed meats containing a greater or less proportion of hulls through the crushing rolls and then into the cookers. The yield of oil is greater if the meal is cooked a long time, say from one hour to an hour and a half, or even two hours, and it is an advantage, from one standpoint, to have an excess of moisture in the early stages of the cooking, moisture being added if the meal is lacking in the requisite amount thereof. The moisture in conjunction with the heat softens the oil cells and increases the yield of oil. This excess moisture is however objectionable when the meal contains hulls, since it also softens the hulls, and causes the extraction of more or less of the coloring matter therefrom, which makes both the oil and the cake dark. While the meats free from hulls will stand considerable cooking without objectionable discoloration, the hulls, if cooked long or with much moisture, will discolor the meal.

The object of this invention is to prepare cotton seed by an economical and efficient method whereby the meats, freed from hulls, are partially cooked in the presence of ample moisture, whereas the hulls are cooked for a shorter period of time and with less moisture, so as thereby to obtain the maximum yield of oil without discoloring either the oil or the cake.

According to this method, the hulls are separated from the meats before the meal is cooked and the meats are partially cooked by themselves with considerable moisture. Then after the meal has passed through its initial sweat, and after a considerable portion of the excess moisture has been removed, the hulls are introduced into the partially cooked meats and the mixed meats and hulls are further cooked together.

The hulls and meats can be separated at any time before the cooking, but preferably the separation is effected before the meats are crushed, and the meats and hulls are ground or crushed separately. By separately crushing or grinding the hulls after they are separated from the meats and before cooking them, the fine meats which are retained with the hulls are crushed, so that the oil will be readily extracted from these. In this way the oil contained in any meats which remain with the hulls is not lost, and it is not so necessary to have the hulls absolutely free from meats. This is an advantage since it is difficult or impractical to completely remove all of the hulls from the meats which are to be cooked alone without also removing some of the meats with the hulls. The crushed or fine hulls are also preferable in the cake.

The material is preferably cooked in continuous cookers of the type which comprise several, say four, cooking kettles or chambers operated in such a way that the material passes more or less continuously or at regulated intervals and in regulated quantities from one kettle to the next. The crushed meats, free from hulls, are introduced into the first kettle and pass through the first two kettles where they are cooked with ample moisture, whereas the crushed hulls together with any meats contained therein, are introduced preferably into the third kettle, so as to be mixed and cooked with the meats after the latter have passed through and been partially cooked in the first two kettles without arresting the continuous operation of the cooker. Thus after the meats have passed through the initial sweat and a considerable portion of the moisture has been removed, the meats and hulls are further cooked together. In this way the coloring matter will not be extracted from the hulls to an objectionable extent, and the meal will retain its bright yellow color, while the yield of oil will be practically the same as in the prior methods, in which the meats and hulls are cooked together for the entire period. The cake therefore remains brighter but nevertheless contains a sufficient amount of hulls to insure the requisite porosity for an easy escape of the oil and to make a marketable cake.

I claim as my invention:

1. The herein described method of treating cotton seed preparatory to expressing the oil therefrom, consisting in separating the hulls from the meats, partially cooking the meats by themselves, and then introducing hulls into the meats without arresting the continuous cooking operation and further cooking the meats and hulls together.

2. The herein described method of treating cotton seed preparatory to expressing the oil therefrom, consisting in hulling the seed, separating the hulls from the meats and reducing the meats to meal, partially cooking the reduced meats by themselves with excess moisture, and then, after the meats have passed through the initial sweat and a portion of the moisture has been removed, introducing hulls into the meats and further cooking the meats and hulls together.

3. The herein described method of treating cotton seed preparatory to expressing the oil therefrom, consisting in separating the hulls from the meats, separately reducing the separated meats and hulls, partially cooking the meats by themselves and then introducing the reduced hulls into the cooker with the meats and further cooking the meats and hulls together.

4. The herein described method of treating cotton seed preparatory to expressing the oil therefrom, consisting in separating the hulls from the meats, crushing the free meats by themselves, separately crushing the hulls together with any meats contained therein, partially cooking the free meats by themselves, and then introducing the crushed hulls with any meats contained therein into the free meats and further cooking the material.

Witness my hand, this 30 day of June, 1914.

ALFRED W. FRENCH.

Witnesses:
 M. M. WHITLOCK,
 C. B. UPTON.

Copies of this patent may be obtained for five cents each, by addressing the "Commissioner of Patents, Washington, D. C."